July 4, 1950 L. T. PHELAN 2,514,087

MODULATED OSCILLATOR

Filed April 18, 1947

INVENTOR
LAWRENCE T. PHELAN

BY

Woodcock and Phelan
ATTORNEYS

Patented July 4, 1950

2,514,087

UNITED STATES PATENT OFFICE 2,514,087

MODULATED OSCILLATOR

Lawrence T. Phelan, Berwyn, Pa.

Application April 18, 1947, Serial No. 742,345

8 Claims. (Cl. 332—27)

This invention relates to oscillator systems used in radio communication and is particularly directed to modulated oscillator systems suited to afford clickless on-off keying, frequency-shift keying or frequency-modulation at audio or higher frequencies.

Generally in accordance with the invention, the keying or modulation is effected by varying the effective magnitude of resistance which controls the phase of the feed-back voltage of an oscillator.

In a preferred form, the oscillator comprises a cathode-follower tube having the frequency-determining element of the oscillator connected between the control grid and cathode in series with the cathode resistor and the feed-back voltage is provided by an amplifier whose grid-cathode circuit includes the cathode-resistor of the cathode-follower tube and a modulating resistance or device which for "on-off" keying is a key operated manually or otherwise. For frequency-shift keying, the keying contacts shunt a finite resistance whose magnitude determines the difference between the "mark" and "space" frequencies generated by the oscillator. For a simple type of frequency modulation, the modulating resistance or device may be a variable-resistance microphone. For the type of frequency modulation having fixed center frequency, the modulating resistance is that of a series resonant circuit whose effective resistance is varied by the modulation energy.

The invention further resides in features of operation and arrangement hereinafter described and claimed.

Generally in accordance with the invention, the modulating resistance whether it be a key, microphone or other modulation device or circuit element is included in the feed-back circuit of the oscillator external to any direct-current anode circuit.

Figure 1:
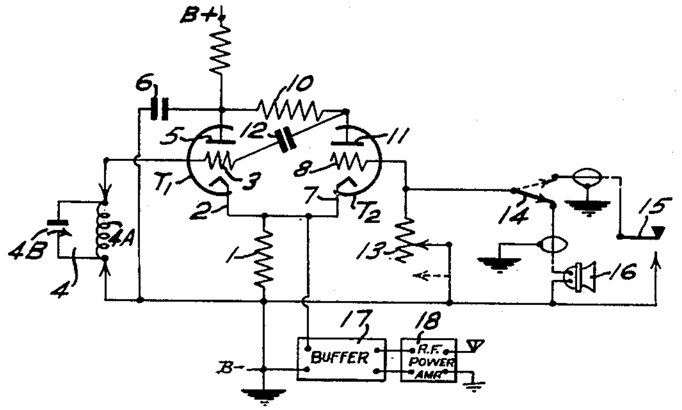
Figure 3:
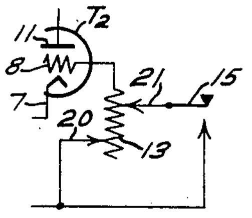
Figure 2:
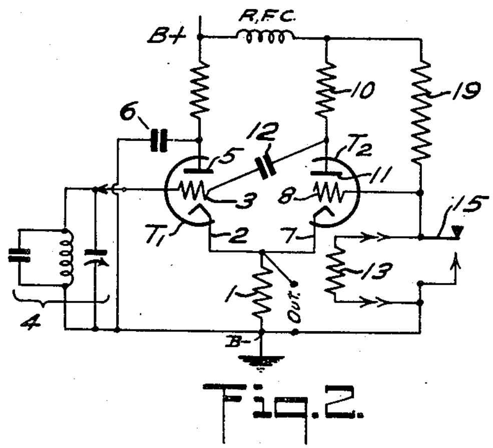
Figure 4:
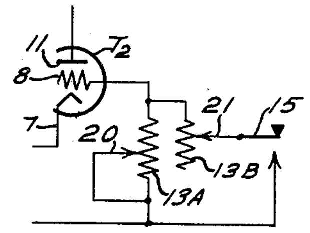
Figure 5:
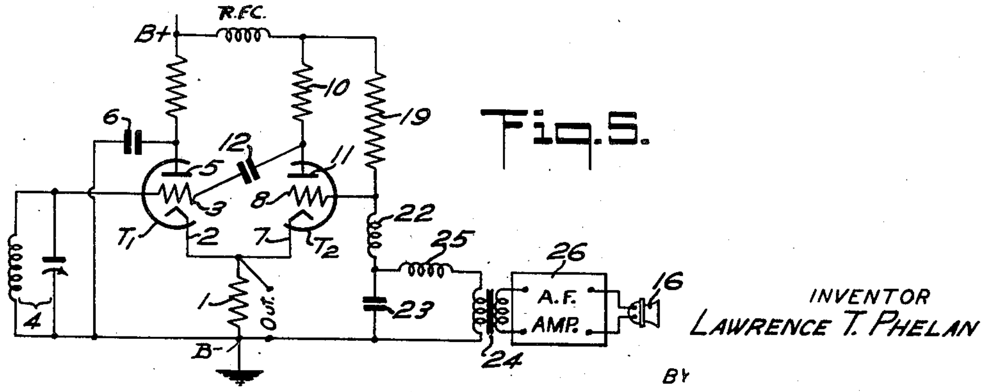

For a more detailed understanding of the invention, reference is made to the accompanying drawings, in which:

Fig. 1 schematically illustrates a modulated oscillator system;

Fig. 2 schematically illustrates a modification of Fig. 1;

Figs. 3 and 4 illustrate modifications of part of the system of Figs. 1 and 2; and Fig. 5 illustrates a further modification suited for a particular type of frequency-modulation.

Referring to Fig. 1, the tube $T_1$ of the oscillator is in a cathode-follower circuit comprising resistor 1 connected from cathode 2 of the tube to the negative terminal B— of a source of direct-current, not shown, for supplying the anode current of the tube. Between the control grid 3 of the tube and the negative terminal of resistor 1 is connected the frequency-determining circuit or element 4 comprising, for example, a fixed inductance 4A and a variable capacitor 4B. The anode 5 of tube $T_1$ is effectively connected to the lower end of the resistor 1, so far as the oscillator frequency is concerned, by the by-pass condenser 6.

Assuming a radio-frequency voltage exists between the terminals of the frequency-determining circuit 4, the anode current of the tube has an alternating component of the same frequency, and, accordingly, a voltage drop of that frequency is produced across the cathode resistor 1 which is also included in the cathode-grid circuit of a second tube $T_2$ in series with a modulating resistance or device which at this time may be considered to be a variable resistance 13.

The high-frequency voltage drop across resistor 1 is therefore applied to the input electrodes 7, 8 of tube $T_2$ and an amplified voltage of this same frequency is produced across the plate circuit impedance 10 of tube $T_2$ as in a grounded-grid amplifier.

The anode 11 of tube $T_2$ is coupled as by capacitor 12 to the control grid 3 of tube $T_1$ to provide a feed-back voltage of proper phase and magnitude for sustained generation of oscillations at a carrier frequency primarily determined by the resonant circuit 4 or equivalent.

However, the magnitude of resistor 13 affects the phase of the feed-back voltage so that it is possible reproducibly to vary the oscillator frequency over a relatively limited but useful range: with increasingly larger magnitudes of resistance 13, a point is reached beyond which the feed-back is of insufficient magnitude or improper phase and the system stops oscillating.

Assuming the variable contacts of the resistor 13 and switch 14 are in the dotted line positions shown, the effect of opening the contacts of the key 15 is the same as abruptly changing the resistance of resistor 13 from low or zero value to very high value so that the oscillator as heard in a communications receiver cleanly stops without chirp or tail to the beat note: moreover the oscillations stop without production of any click or thump in receivers tuned for reception on more or less adjacent channels. Upon reclosure of the key, the oscillations promptly start without any "yoop," click or thump as heard by such receivers.

This is in marked contrast to the strong key cliks or thumps commonly produced by "on-off" keying and which disturb receivers over a considerable range on either side of the carrier frequency of the keyed transmitter. In prior attemps to reduce key clicks, recourse has been had to keying filters, but they adversely affect the quality or beat-note of the received signal causing "yoops" or "chirps." For brevity, on-off keying free of such transients as thumps, yoops, clicks and chirps shall be termed "clean" keying.

For frequency-shift keying, the contact of resistor 13 is adjusted to a magnitude which for opening and closure of the contacts of key 15 gives the desired 'mark" and "'space" frequencies. With key down or closed, the oscillations generated are of one frequency and with the key 15 up or open the oscillations are of different frequency. When a suitable selective filter is used in the associated receivers, the value of resistance 13 may be low, as of the order of an ohm or less, to produce a change of only a few cycles of the oscillator frequency as the key 15 is opened and closed. The beat-note of the oscillator as heard in the receiver changes cleanly from one fixed tone to another without yoops, chirps or clicks and produces no interference in adjacent channels: with a suitably sharp filter, and the receiver tuned to the "mark" frequency, the signals sound the same as those produced by "on-off" keying.

The changeover from "on-off" keying to frequency-shift keying involves no more than connection or disconnection of resistor 13 of suitable magnitude.

By substituting a microphone 16 for key 15 as by throwing switch 14 to the full-line position of Fig. 1, the carrier of the oscillator may be frequency-modulated at voice frequencies. The variation in resistance of the microphone at audio-frequencies effects corresponding shifts in phase of the feed-back voltage of the oscillator and so causes the carrier frequency to vary at audio-frequencies. The extent to which the carrier frequency shifts for a given audio input may be controlled by adjustment of resistance 13.

For any of these methods of modulation, the oscillator is preferably coupled to the antenna, or other load circuit, through a buffer stage 17 and a power amplifier stage 18, either or both of which may be frequency multipliers.

The following circuit elements and constants are given by way of example:

Tube $T_1$—$T_2$, 6SN7GT (duplex-triode)
Cathode resistor 1, 400 ohms
Resistor 10, 60,000 ohms
Condenser 12, 35 micromicrofarads
Resistor 13, 300 ohms max.

With the fundamental oscillator frequency in the 80 meter band the frequency swing with resistor 13 out of circuit was of the order of 15 to 20 kilocycles using a carbon microphone: that is, the total band width was of the order of 0.5% of the carrier-frequency which is ample for so-called "narrow-band" FM when the transmitter carrier-frequency is low and is ample for so-called "wide-band" FM when the modulated oscillator output is fed to the transmitter antenna through harmonic amplifiers. The on-off keying and frequency-shift keying were free of clicks, chirps and yoops on the fundamental frequency and on all harmonic frequencies checked up to and including the tenth harmonic. The anode voltage was low, about 30 volts.

For on-off keying at higher anode supply voltages, it was found desirable to connect the control grid 8 of the feed-back tube $T_2$ to a point of fixed potential to avoid, under key-up conditions, undesired oscillations sometimes occurring and at frequencies far removed from the carrier frequency under key-down condition. For example, as shown in Fig. 2, the control grid 8 may be connected through a high resistance 19 to the positive terminal of the anode power supply. The magnitude of this resistance is preferably so selected or adjusted that the direct-current traversing the common cathode resistor 1 changes but slightly during keying; that is, the direct-current voltage drop across resistance 1 is about the same whether the key is up or down. With proper adjustment of resistance 19, the oscillator frequency is extremely stable and irrespective of the relative or absolute durations of the active and inactive periods of the oscillator.

This modification may be used for frequency-shift keying by connecting resistor 13 in shunt to key 15 or for frequency-modulation at audio-frequencies by connecting a microphone in shunt to or in place of the key.

In either Fig. 1 or Fig. 2, the resistor 13 may, as shown in Fig. 3, be provided with two contacts, one (20) of which is adjustable precisely to set the "space" frequency, and the other (21) of which is adjustable to set the "mark" frequency. Alternatively, as shown in Fig. 4, two resistors 13A, 13B may be used: the adjustment of contact 20 exactly determines the "space" frequency and the adjustment of contact 21, independently of the setting of contact 20, determines the "mark" frequency.

In the type of frequency-modulation herein previously described, the deviation of the carrier frequency during modulation is to one side only of the unmodulated carrier frequency. For reception with a superheterodyne receiver suited to receive amplitude modulated (AM) signals, it is slightly detuned so that the unmodulated carrier is on one or the other side or skirt of the frequency-selective characteristic of the intermediate-frequency amplifier. Signals with this type of frequency-modulation can also be received on the conventional FM receiver using a discriminator circuit but without benefit of the limiter action, as the center frequency is a function of the modulation and is different from the unmodulated carrier frequency.

To obtain double-sided frequency modulation which affords a fixed center frequency corresponding with the unmodulated carrier frequency and so provides for all of the advantages of frequency-modulation including static-free reception with a conventional FM receiver, the resistor 13 of any of the preceding figures is replaced, as in Fig. 5, by a series-resonant circuit comprising inductance 22 and capacitor 23 tuned to the oscillator frequency. Under conditions of no modulation, this series-resonant circuit is the effective equivalent of a low fixed resistance 13 and the oscillations generated are of the desired carrier-frequency primarily determined by the constants of the circuit 4.

The effective resistance of the series-resonant circuit may be increased and decreased symmetrically about a fixed value at audio or other modulation frequencies so to effect corresponding deviations of the carrier frequency symmetrically on both sides of its unmodulated magnitude by injecting audio-frequency energy into the series resonant circuit. In the particular arrangement shown in Fig. 5, the secondary of a modulation transformer 24 is connected across the condenser 23 in series with radio-frequency choke-coil 25. Between the modulation transformer and the source of modulating voltage generically represented by microphone 16 may be included an amplifier 26 when found necessary for wide-band modulation. The amplifier 26 need have little power or gain to effect substantial frequency-modulation of the oscillator frequency at the input levels obtained with any of the usual types of microphones or pickup devices including the piezo-electric and dynamic types.

It shall be understood the invention is not limited to the embodiments specifically disclosed and that changes and modifications may be made within the scope of the appended claims.

What is claimed is:

1. A frequency-modulated oscillator comprisin two tubes and a resonant circuit coupled for generation of oscillations, a series-resonant circuit in the grid-cathode circuit of one of said tubes external to said first-named resonant circuit and whose effective resistance determines the phase of a feed-back voltage sustaining the generation of oscillations, and modulation means for varying the effective resistance of said series resonant circuit.

2. A frequency-modulated high-frequency oscillator comprising a cathode-follower tube and a grounded-grid amplifier tube, resistance means common to the cathode circuits of said tubes, feedback coupling means between the grid of said cathode-follower tube and the anode of said grounded-grid amplifier tube, a carrier frequency-determining circuit connected from the grid of said cathode-follower tube to its cathode through said cathode-resistance means and independently of said feedback coupling means, a series-resonant circuit connected from the grid of said amplifier tube to its cathode through said cathode-resistance means, and modulation means for varying the effective resistance of said series-resonant circuit.

3. A frequency-modulated high-frequency oscillator comprising a cathode-follower tube and a grounded-grid amplifier tube, resistance means common to the cathode circuits of said tubes, feedback coupling means between the grid of said cathode-follower tube and the anode of said grounded-grid amplifier tube, a carrier-frequency determining circuit connected from the grid of said cathode-follower tube to its cathode through said cathode-resistance means and independently of said feedback coupling means, and modulating means whose resistance is varied at modulating frequency continuously connected from the grid of said amplifier tube to its cathode through said cathode-resistance means to vary the phase of the high-frequency voltage between the cathode and grid of said amplifier tube.

4. An oscillator system keyed for frequency-shift between mark and space frequencies comprising two electronic tubes, resistance means common to the anode circuits of said tubes, feedback coupling means between the grid of said cathode-follower tube and the anode of said grounded-grid amplifier tube, a carrier-frequency determining circuit connected from the grid of said cathode-follower tube to its cathode through said cathode-resistance means and independently of said feedback coupling means, and modulating means comprising resistance means continuously connected from the grid of said amplifier tube to its cathode through said cathode-resistance means, and a key for varying the magnitude of said last-named resistance means between discrete finite values correspondingly to shift the phase of the high-frequency voltage between the cathode and grid of said amplifier tube.

5. An oscillator system providing clean on-off keying comprising a cathode-follower tube and a grounded-grid amplifier tube, resistance means common to the cathode circuits of said tubes, feedback coupling means between the grid of said cathode-follower tube and the anode of said grounded-grid amplifier tube, a carrier-frequency determining circuit connected from the grid of said cathode-follower tube to its cathode through said cathode-resistance means and independently of said feedback coupling means, and on-off modulating means connected in circuit from the grid of said amplifier tube to its cathode through said cathode-resistance means and in a path free of direct-current components of the anode currents of said tubes comprising keying means for making and breaking said circuit.

6. An oscillator system providing clean on-off keying comprising a cathode-follower tube and a grounded-grid amplifier tube, resistance means common to the cathode circuits of said tubes, feedback coupling means between the grid of said cathode follower-tube and the anode of said grounded-grid amplifier tubes, a carrier-frequency determining circuit connected from the grid of said cathode-follower tube to its cathode through said cathode-resistance means and independently of said feedback coupling means, on-off modulating means connected in circuit from the grid of said amplifier tube to its cathode through said cathode-resistance means and in a path free of direct-current components of the anode currents of said tubes comprising keying means for closing and opening said circuit to shift its frequency to and from zero at extremely high rate, and resistance means for maintaining the grid of said amplifier tube at stably fixed potential during open-circuit position of said keying means.

7. A system as in claim 6 in which the resistance means is connected from the grid of the amplifier tube to a point of positive potential and is of magnitude for which the combined anode currents of said tubes through said cathode-resistance means is substantially the same for both the open and closed circuit conditions of said keying means.

8. A modulated high-frequency oscillator comprising a cathode-follower tube and a grounded-grid amplifier tube, resistance means common to the cathode circuits of said tubes, feedback coupling means between the grid of said cathode-follower tube and the anode of said grounded-grid amplifier tube, a carrier-frequency determining circuit connected from the grid of said cathode-follower tube to its cathode through said cathode-resistance means and independently of said feedback coupling means, and modulating means whose resistance is varied in accordance with the modulation connected from the grid of said grounded-grid amplifier tube to its cathode through said cathode-resistance means and in a path free of the direct-current components of the anode currents of said tubes.

LAWRENCE T. PHELAN.

REFERENCES CITED

The following references are of record in the file of this patent:

UNITED STATES PATENTS

| Number | Name | Date |
|---|---|---|
| 2,269,417 | Crosby | Jan. 6, 1942 |
| 2,321,269 | Artzt | June 8, 1943 |
| 2,426,295 | Born | Aug. 26, 1947 |